United States Patent Office 2,784,163
Patented Mar. 5, 1957

2,784,163
BIS(DIALKYL)URETHANE POLYMERS AND THEIR PREPARATION

Delbert D. Reynolds and Thomas M. Laakso, Rochester, N. Y., assignors to Eastman Kodak Company, Rochester, N. Y., a corporation of New Jersey No Drawing. Application February 10, 1954, Serial No. 409,529

14 Claims. (Cl. 260—2.5)

This invention relates to bis(dialkyl)urethane polymers and their preparation, and is particularly concerned with linear and cross-linked polymers prepared by the self-condensation of a bis(dialkyl)urethane.

It is an object of this invention to prepare a new group of condensation polymers by the self-condensation of bis(dialkyl)urethanes to form either linear or cross-linked polymers. It is another object of this invention to provide a new class of linear polyureas which are soluble in organic solvents, and which can be used for forming tough, colorless layers in the preparation of photosensitive materials such as photographic film. Another object of the invention is to prepare foamed polymers which are tough and insoluble in most organic solvents by the self-condensation of bis(dialkyl)urethanes, carried out until the linear polymer formed initially has cross-linked to the insoluble form. Other objects will be apparent from the description and claims which follow.

These and other objects of the invention are attained by polymerizing a bis(dialkyl)urethane of the formula

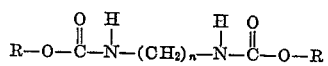

wherein R is a saturated alkyl group, and $n$ is a whole integer, by heating the bis(dialkyl)urethane in the presence of an alkaline ester-interchange catalyst. The preparation of polymeric materials in accordance with this invention differs from the polymerization of urethanes wherein the terminal groups are unsaturated hydrocarbon groups. In these latter materials, polymerization takes place by a vinyl-type addition, whereas in the process embodying this invention, the self-condensation occurs by the elimination of alcohol during the condensation. In practicing this invention, any of the saturated bis(dialkyl)-urethanes of the formula set out hereinabove can be used. Desirably, however, R is a saturated alkyl group of from 1 to 4 carbon atoms, and $n$ is an integer in the range of 2 to 8.

The bis(dialkyl)urethanes employed in practicing the invention are readily prepared by reacting a polymethylene diamine with an alkyl chlorocarbonate at an elevated temperature, and in the presence of base. Any of the well known polymethylene diamines can be employed, such as, for example, ethylene diamine, trimethylene diamine, hexamethylene diamine, octamethylene diamine, and the like. The particular dialkyl chlorocarbonate which is employed will depend upon the particular urethane desired. Usually ethylchlorocarbonate is employed, whereby a bis(diethyl)urethane is obtained. The other well known alkyl chlorocarbonates can be employed, however, including methyl chlorocarbonate, propyl chlorocarbonate, and butyl chlorocarbonate.

The bis(dialkyl)urethane thereby obtained is then polymerized by heating it in the presence of an alkaline ester-interchange catalyst. A large number of such alkaline catalysts are well known in the art, and any of such materials can be employed. Thus, for example, typical catalysts which are suitable include the alkaline earth oxides, hydroxides, and alcoholates such as calcium oxide, calcium hydroxide, strontium oxide, strontium hydroxide, calcium methylate, calcium ethylate, barium oxide, barium hydroxide, strontium methylate, strontium ethylate, and the like; as well as the alkali metals, such as sodium, potassium, and lithium; as well as their hydrides, such as sodium hydride, hydroxides, such as sodium hydroxide, potassium hydroxide, or the like; and alcoholates, such as sodium methylate, sodium ethylate, and the like; aluminum alkoxides, such as aluminum isopropoxide; double metal hydrides, such as lithium aluminum hydride, sodium boro hydride, and the like; and any of the other well known esterinterchange catalysts which exhibit an alkaline reaction. Such catalytic materials have been widely used in both alcoholysis and ester-ester interchange reactions, and their nature is not critical. The amount of catalyst which is employed can be varied in accordance with usual practices, and for most purposes a catalyst concentration of about 1 percent based on the weight of the bis urethane being polymerized is sufficient, although larger amounts, such as 2 or 3 percent, or smaller amounts, such as 0.5, 0.1 or lower, can be used.

The exact mechanism by which the condensation polymer is formed is not understood, and it is not intended that the invention be limited by any theory which might be advanced here to explain the reaction. It appears, however, that there are probably three major reactions taking place. When the bis(urethane) first condenses, it appears that a linear polyurea is formed by splitting out alcohol between two molecules of the monomer. This reaction appears to proceed as follows:

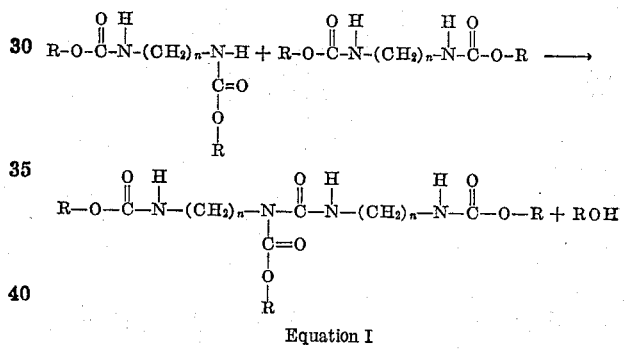

Equation I

After the condensation has proceeded to give a polymeric product, it appears that a second reaction involving cross-linking of the linear polymer occurs. In this cross-linking reaction, the solvent-soluble polymer formed in the initial reaction is converted to a solvent-insoluble foamed polymer resembling foamed hard sponge. This cross-linking stage of the polymerization is readily detected, since the reaction mixture begins to evolve large quantities of carbon dioxide when the cross-linking begins. As before, the exact nature of the cross-linking is not clearly understood. One mechanism which can be postulated to explain the cross-linking reaction is as follows:

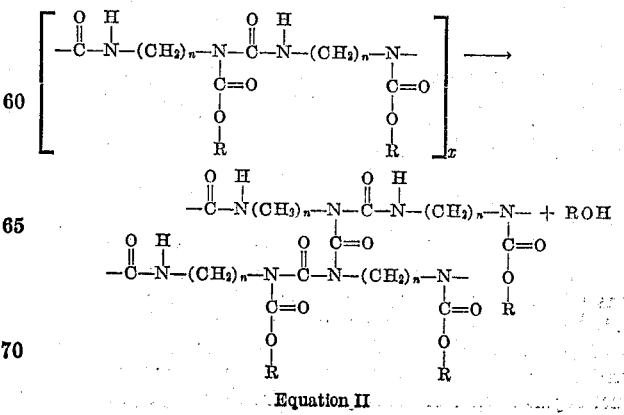

Equation II

It appears that a third type of reaction also occurs, particularly with the bis(urethanes) of the lower polymethylene diamines wherein $n$ is 2 or 3. During the preparation of such polymers, an alkyl carbonate is often formed as a by-product as well as a urea compound or its polymers. The reaction involving formation of the polymer, the urea compound, and a dialkyl carbonate can be postulated as follows:

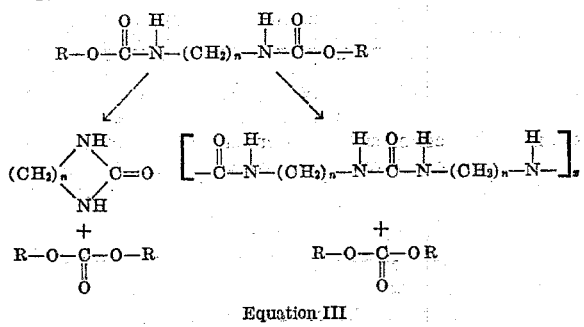

Equation III

In each of the above-noted equations, R represents a saturated alkyl group, and desirably a lower alkyl group containing from 1 to 4 carbon atoms, such as a methyl, ethyl, propyl or butyl group. The value for $n$ will depend, of course, upon the particular polymethylene diamine used in preparing the bis(dialkyl)urethane. In most cases, it is desirable that $n$ be a whole integer in the range of from 2 to 8, although $n$ may be a larger whole integer if desired. For many uses, it is desirable to interrupt the course of the polymerization following the initial stage wherein a linear polyurea is formed and before any substantial degree of cross-linking occurs. This can be readily done, since the heating of the reaction mixture can be interrupted as soon as foaming of the mixture begins, and the small amount of insoluble, foamed, cross-linked polymer can be separated from the reaction mixture by dissolving the linear polyurea in a suitable organic solvent such as dimethyl formamide. This initial polymer is usually a clear, colorless polymer, which is readily soluble in any of the common organic solvents ordinarily used for preparation of polymer dopes. Such solvents include dimethyl formamide, dimethyl acetamide, phenol, and the like. This initial polymer is useful as a subbing base which can be deposited onto a suitable film base material, such as the polyester and polyamide type film bases used in the preparation of photographic materials. This subbing layer induces adherence of the emulsion layer to the film base material in the manufacture of photosensitive sheet material, such as photographic film and photosensitive papers. The polymers embodying this invention can be used in the manufacture of both black-and-white and color films. The polymers can also be prepared by either a batch or a continuous process in accordance with usual chemical practice.

When an insoluble foamed product is desired, the polymerization reaction can be continued until carbon dioxide is liberated and a frothy polymer foam is formed. This material is so insoluble in most organic solvents that it can be used in applications where a light weight filler which is not subject to attack by solvents or oils is desired. In the case of the lower urethane derivatives, the polymeric product which is obtained even from the initial reaction is usually a mixture of the linear polyurea and a polymethylene urea which may or may not be polymerized. This mixture can be used in a similar manner to the linear polyurea itself, or the polymer can be separated from the urea derivative by means of the differential solubility of the two materials. The temperature at which the polymerization is effected is usually between 150 and 250° C., and if desired, higher temperatures of as much as 300° C. can be employed. The only practical limit on the temperature is the point at which the polymeric product begins to char or decompose. The time of polymerization will vary, of course, depending upon the material being polymerized, the temperature employed, the nature of the catalyst and its concentration, and similar variable factors. Usually the initial polymerization is substantially complete in periods of less that about one hour, although longer periods may be necessary in some cases. When the reaction mixture solidifies during the polymerization, it is sometimes desirable to gradually raise the temperature until the product becomes molten. This is particularly true when it is desired to carry the reaction into the cross-linking stage.

The invention is illustrated by the following specific examples employing certain preferred embodiments of the invention. It will be understood, however, that the examples are included for purposes of illustration and are not intended to limit the scope of the invention unless otherwise specifically indicated.

*Example 1*

A bis(urethane) was prepared by reacting hexamethylenediamine with ethyl chlorocarbonate in pyridine. A 100 g. portion of this bis(urethane) was heated at 240° C. under nitrogen with no evidence of reaction. Thereupon 3 cc. of a catalyst solution prepared by dissolving 1 g. of lithium aluminum hydride in 85 cc. of ethanol was added to the reaction mixture. Ethanol began to distill at once and continued to be evolved until a total of 30 cc. was collected. During this stage of the polymerization, no carbon dioxide was liberated as checked by the lime water test. After the reaction had proceeded for 40 minutes, the cross-linking reaction began, as indicated by the product beginning to froth on the surface. The reaction flask was removed at once from the oil bath, and the viscous, colorless polymer was poured from the flask. This polymer cooled to a tough, white gum, which was dissolved in hot dimethyl formamide and precipitated into water. The froth formed by cross-linking of the linear polymer was insoluble in the hot dimethyl formamide. The soluble polymer was leached for six days in ethanol, dried, and analyzed for C, 56.6; H, 8.6; and N, 14.8. The calculated value for the polymer produced in accordance with Equation I is C, 56.0; H, 8.4; and N, 13.1.

*Example 2*

A 100 g. portion of the bis diethyl urethane of hexamethylenediamine was heated at 260° C. under nitrogen with 10 cc. of catalyst solution prepared by dissolving 1 g. of strontium in 200 cc. of methanol. After 30 minutes, the reaction began to foam. The nonfoaming portion was separated as a clear, viscous material. When cooled, it was rubbery and had a waxy feel. The polymer was dissolved in hot dimethyl formamide, filtered, and precipitated in ether as a white, fibrous polymer analyzing C, 56.8; H, 8.7; and N, 15.3. The intrinsic viscosity of the polymer in 60:40 phenol:tetrachloroethane was 0.48. This polymer could be used in the form of a dope in hot dimethyl formamide for casting clear films or for spinning of tough rubbery fibers.

*Example 3*

In the preceding examples, the condensation reaction was effected without the use of a solvent. An attempt was made to carry out the polymerization reaction in a solution of dimethyl formamide according to the following procedure. A 50 g. portion of bis(diethyl)hexamethylene urethane was dissolved in 50 cc. of dimethyl formamide, and 50 cc. of a catalyst solution prepared by dissolving 1 g. of strontium in 200 cc. of methanol was added. The reaction flask was heated gradually in an oil bath, but polymerization did not begin until practically all of the solvent had distilled away. Thereafter the polymerization proceeded as in the preceding examples. The soluble linear polymer was separated from the insoluble cross-linking foam by dissolving it in hot dimethyl formamide and precipitating the linear polymer into ether. This linear polymer analyzed for C, 54.0; H, 7.9; and N, 15.1. The insoluble foam, when extracted with ether and dried, contained C, 56.1; H, 8.1; and N, 15.4.

*Example 4*

Bis(diethyl)urethane of trimethylene diamine was prepared by reacting trimethylene diamine with ethyl chlorocarbonate in the presence of aqueous sodium hydroxide. The monomer thus obtained had a melting point of 41–43° C. A 50 g. portion of this urethane derivative was mixed with 10 cc. of a catalyst solution prepared by dissolving 1 g. of strontium in 200 cc. of methanol. The mixture was placed in a 200 cc. flask and was heated under nitrogen in an oil bath. The temperature was raised slowly, and the melt solidified at 180° C. and did not melt when the temperature was raised to 250° C. At this point the reaction mixture was cooled, and the soluble product was extracted out with dimethyl formamide. This soluble portion was precipitated in ether, dried and analyzed. The product showed C, 48.9; H, 8.2; and N, 26.6 as compared to a calculated value of C, 48; H, 8; and N, 28 for N,N'-trimethylene urea. The product melted at 265° C. The literature cites the M. P. of the cyclic-urea as 260° C. The insoluble portion was polymeric and appeared to be a polyurea formed in accordance with Equation III.

*Example 5*

A 62 g. portion of the bis(diethyl)urethane obtained from ethylene diamine was mixed with 3 cc. of a catalyst solution such as was employed in Example 1. The reaction mixture was heated in a 200° C. oil bath. After a reaction of 45 minutes, the product set to a white solid which was insoluble in many organic solvents or water, but which was soluble in warm phenol. A sample of this product was dissolved and precipitated into methanol, leached in ethanol, dried and analyzed to give C, 43.0; H, 6.4; N, 27.3. The remainder of the product was powdered and extracted with ethanol. This product analyzed for C, 42.7; H, 6.3; and N, 27.7. The calculated values for N,N'-ethyleneurea or the corresponding linear polyurea are C, 41.9; H, 6.9; and N, 32.5 and for a linear polymer of the type shown in Equation I are C, 45.5; H, 6.3; and N, 17.7. The analystical values appear to indicate that the polymeric product is a mixture of these materials.

*Example 6*

A 7 g. portion of the bis(diethyl)urethane of octamethylene diamine was heated under nitrogen with 1 cc. of catalyst prepared by dissolving 1 g. of lithium aluminum hydride in 85 cc. of ethanol. After 25 minutes, a clear, viscous polymer had formed. Within another 5 minutes, this polymer set to an insoluble gel. This clear gel was very rubberlike in physical appearance.

Similar polymeric products are obtained with the other bis(dialkyl)urethanes as described hereinabove when subjected to the polymerization reaction embodying this invention. The polymers which are obtained are tough, rubbery and clear for the most part. The reaction proceeds readily with any of the common alkaline ester-interchange catalysts, and the reaction can be stopped after the initial reaction stage whereby a linear polyamide is obtained, or can be allowed to proceed to give a cross-linked polymer.

Although the invention has been described in considerable detail with particular reference to certain preferred embodiments variations and modifications can be effected within the spirit and scope of the invention as described hereinabove, and as defined in the appended claims.

We claim:
1. The method which comprises homopolymerizing a bis(dialkyl)urethane of the formula

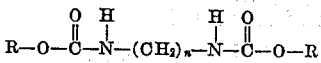

wherein R is a saturated alkyl group and $n$ is an integer in the range of 2 to 8 inclusive, by heating said bis(dialkyl)urethane in the presence of an alkaline ester-interchange catalyst.

2. The method which comprises homopolymerizing a bis(dialkyl)urethane of the formula

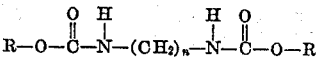

wherein R is a saturated alkyl group and $n$ is an integer in the range of 2 to 8 inclusive, by heating said bis(dialkyl)urethane in the presence of an alkaline ester-interchange catalyst, said heating being continued until said bis(dialkyl)urethane has polymerized to form a solvent-soluble linear polymer, and being discontinued before substantial cross-linking of said polymer occurs.

3. The method which comprises homopolymerizing a bis(dialkyl)urethane of the formula

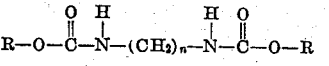

wherein R is a saturated alkyl group and $n$ is an integer in the range of 2 to 8 inclusive, by heating said bis(dialkyl)urethane in the presence of an alkaline ester-interchange catalyst, said heating being continued until a substantial amount of carbon dioxide is evolved, whereby an insoluble foamed polymer is obtained.

4. The method which comprises homo-polymerizing a bis(diethyl)urethane of the formula

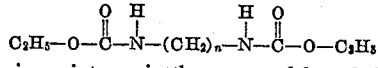

wherein $n$ is an integer in the range of 2 to 8, by heating said bis(diethyl)urethane in the presence of an alkaline ester-interchange catalyst.

5. The method which comprises homo-polymerizing a bis(diethyl)urethane of the formula

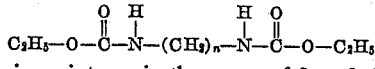

wherein $n$ is an integer in the range of 2 to 8, by heating said bis(diethyl)urethane in the presence of an alkaline ester-interchange catalyst until polymerization is effected, said heating being discontinued before substantial cross-linking occurs.

6. The method which comprises homo-polymerizing a bis(diethyl)urethane of the formula

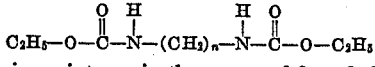

wherein $n$ is an integer in the range of 2 to 8, by heating said bis(diethyl)urethane in the presence of an alkaline ester-interchange catalyst, said heating being continued until an insoluble cross-linked polymer is obtained.

7. A polymeric self-condensate obtained by heating in the presence of an alkaline ester-interchange catalyst a bis(dialkyl)urethane of the formula

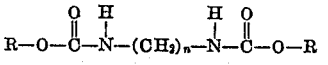

wherein R is a saturated alkyl group and $n$ is an integer in the range of 2 to 8 inclusive.

8. A linear homo-polymer obtained by heating a bis(dialkyl)urethane of the formula

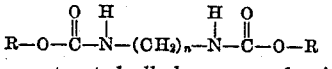

wherein R is a saturated alkyl group and $n$ is an integer in the range of 2 to 8 inclusive, in the presence of an alkaline ester-interchange catalyst until said bis(dialkyl)- urethane has polymerized to a linear polymer, but discontinued before substantial cross-linking occurs.

9. A homo-polymer obtained by heating a bis(dialkyl)urethane of the formula

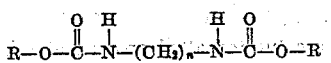

wherein R is a saturated alkyl group and $n$ is an integer in the range of 2 to 8 inclusive, in the presence of an alkaline catalyst until a cross-linked insoluble product is formed.

10. A condensation homopolymer resulting from heating in the presence of an alkaline ester interchange catalyst the material of the formula $$C_2H_5-O-\overset{O}{\underset{\|}{C}}-\overset{H}{\underset{|}{N}}-(CH_2)_2-\overset{H}{\underset{|}{N}}-\overset{O}{\underset{\|}{C}}-O-C_2H_5$$

11. A condensation homopolymer resulting from heating in the presence of an alkaline ester interchange catalyst the material of the formula

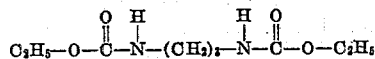

12. A condensation homopolymer resulting from heating in the presence of an alkaline ester interchange catalyst the material of the formula

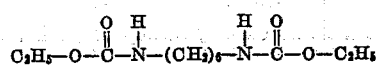

13. A condensation homopolymer resulting from heating in the presence of an alkaline ester interchange catalyst the material of the formula

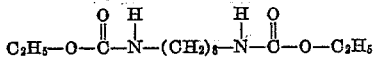

14. A linear polymer substantially free of cross-linking and obtained by the self-condensation of a bis-(diethyl)urethane of the formula

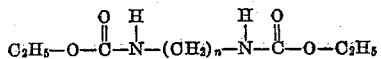

wherein $n$ is an integer in the range of 2 to 8, said self-condensation being effected by heating said bis(diethyl)-urethane in the presence of an alkaline ester-interchange catalyst.

References Cited in the file of this patent

FOREIGN PATENTS 873,993     France _____ Apr. 13, 1942

OTHER REFERENCES

Curtius et al.: Berichte Deut. Chem. Gesel. vol. 45, pages 1084, 1085, 1912.